US012650369B2

(12) United States Patent　(10) Patent No.:　US 12,650,369 B2

Luo　(45) Date of Patent:　Jun. 9, 2026

(54) TEST ASSEMBLY AND METHOD OF TESTING AN ASSEMBLY FOR THERMAL FATIGUE

(71) Applicant: Schaeffler Technologies AG & Co. KG, Herzogenaurach (DE)

(72) Inventor: Tuo Luo, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 685 days.

(21) Appl. No.: 17/952,751

(22) Filed: Sep. 26, 2022

(65) Prior Publication Data

US 2024/0102904 A1　Mar. 28, 2024

(51) Int. Cl.
　*G01N 3/60*　(2006.01)
　*G01N 3/32*　(2006.01)

(52) U.S. Cl.
　CPC ................. *G01N 3/60* (2013.01); *G01N 3/32* (2013.01); *G01N 2203/0064* (2013.01); *G01N 2203/0066* (2013.01); *G01N 2203/0073* (2013.01); *G01N 2203/0224* (2013.01)

(58) Field of Classification Search
　CPC ............. G01N 3/60; G01N 2203/0064; G01N 2203/0073; G01N 2203/0224; G01N 2203/0262; G01N 2203/0266; G01N 2203/037; G01N 2203/0274; G01N 2203/0057; G01N 3/32; G01N 2203/0066
　See application file for complete search history.

(56) References Cited

U.S. PATENT DOCUMENTS

| | | | | |
|---|---|---|---|---|
| 4,075,886 | A | * | 2/1978 | Barker ..................... G01N 3/20 73/806 |
| 5,691,682 | A | * | 11/1997 | Jeffers .................... G06K 1/125 335/302 |
| 5,916,811 | A | * | 6/1999 | Stroosnijder ............ G01N 3/60 436/56 |
| 6,935,187 | B1 | * | 8/2005 | Gorman ................... G01N 3/32 73/811 |
| D799,939 | S | * | 10/2017 | Lowitz ........................... D8/382 |

OTHER PUBLICATIONS

"Study On Crack Resistance Improvement of Epoxy Insulation", Youngkil Ha, et al., Jul. 1999 (available at: https://koreascience.kr/article/CFKO199903977692254.pdf) (English Language Abstract).

* cited by examiner

*Primary Examiner* — Randy W Gibson

(74) *Attorney, Agent, or Firm* — Volpe Koenig

(57)　ABSTRACT

A method of testing a test specimen assembly is disclosed herein. The method can include providing the test specimen assembly which includes a control element and a test element, which are formed from different materials.

21 Claims, 3 Drawing Sheets

TEST ASSEMBLY AND METHOD OF TESTING AN ASSEMBLY FOR THERMAL FATIGUE

FIELD OF INVENTION

The present disclosure relates to a method of testing a specimen assembly, and a test specimen assembly.

BACKGROUND

Thermal fatigue testing is a well-known process in which cyclic temperature changes are applied to a specimen component in order to determine thermal cycling fatigue durability. One known method of thermal fatigue testing includes embedding at least a portion of a control element within a test element to form a specimen assembly, and cyclically heating and cooling the specimen assembly.

The control element can be any component, such as a washer (i.e. an Olyphant washer) or a nut, which has known thermal expansive properties.

The test element can include a potting material, resin material, or plastic material that encapsulates at least a portion of the control element.

Based on the differences between the coefficients of thermal expansion between the control element and the test element, fatigue cracking is induced and characteristics of the test element can be analyzed based on the induced fatigue cracking.

While aspects of thermal fatigue testing are known, it would be desirable to provide a specimen assembly that more reliably experiences fatigue cracking such that testing and screening of the test element can be accelerated.

SUMMARY

A method for testing thermal fatigue is disclosed herein. A test specimen assembly is also disclosed herein.

In one example, the method of testing thermal fatigue comprises providing a test specimen assembly including a control element at least partially embedded within a test element. The control element comprises a body having a discontinuous profile and a slot. The control element can be comprised of steel, and the testing element can be comprised of potting material.

The method can also comprise cyclically subjecting the test specimen assembly to a first temperature and a second temperature for a period of time until the test specimen assembly experiences fatigue cracking. The first temperature and the second temperature can have a temperature differential. The temperature differential can be at least 100° C.

The control element can further comprise a first axial end and a second axial end. The slot can extend continuously between the first axial end and the second axial end. At least one of the first axial end or the second axial end of the control element can be coplanar with an axial end of the test element. The body of the control element can have a continuously curved.

The body of the control element can have a length (L) and a thickness (T), and the length (L) is at least 10 times greater than the thickness (T). In another example, the length (L) is at least 15-40 times greater than the thickness (T).

The body of the control element can have a thickness (T) and the slot can have an extent (E), and the extent (E) is 80%-120% of the thickness (T). The test element can have a depth (D) and the body of the control element can have a length (L) that is 70%-90% of the depth (D).

The test specimen assembly can be formed via pouring the test element to encapsulate the control element or can be formed via injection molding of the test element around the control element.

A test specimen assembly is also disclosed herein that comprises a test element comprised of or consisting of a potting material, and a control element comprising a body formed from a metal and having a discontinuous profile with a slot. The control element can be at least partially embedded within the control element. The test specimen assembly can be configured to undergo thermal fatigue testing until the test specimen assembly experience fatigue cracking.

The control element can further comprise a first axial end and a second axial end. The slot can extend continuously between the first axial end and the second axial end, and at least one of the first axial end or the second axial end can be coplanar with an axial end of the test element.

A method of forming a test specimen assembly for thermal fatigue testing is also disclosed herein. The method can comprise: (a) providing a control element comprising a body formed from metal and having a discontinuous profile with a slot extending between a first and second axial end of the body; and (b) embedding the control element at least partially within a test element to form the test specimen assembly.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figures 1A, 1B, 1C:
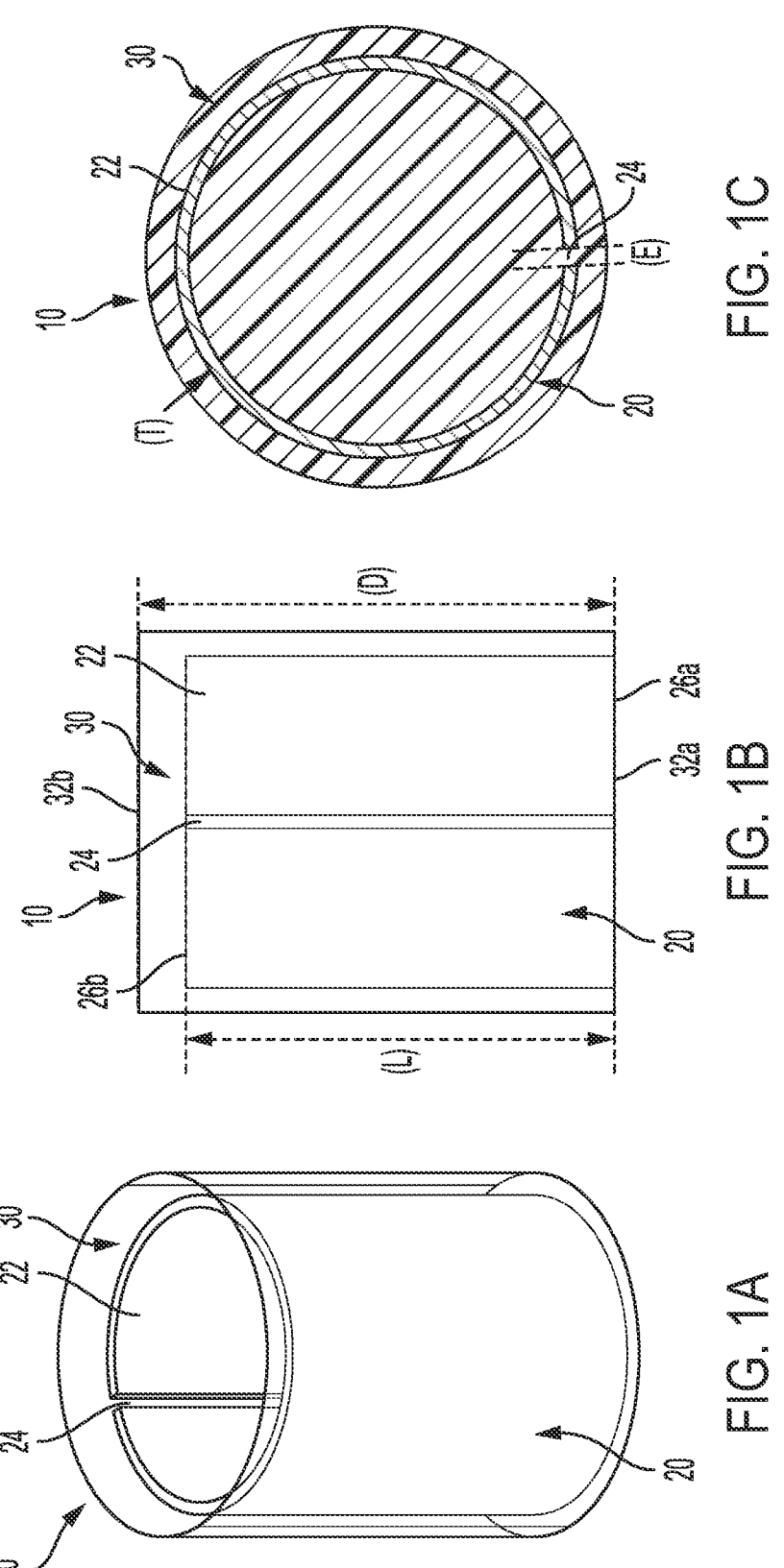
FIG. 1A is a perspective, transparent view of a test specimen assembly.
FIG. 1B is a side view of the test specimen assembly of FIG. 1A.
FIG. 1C is a top view of the test specimen assembly of FIGS. 1A and 1B.

FIGS. 1A-1C illustrate a test specimen assembly 10 according to one example of this disclosure. The test specimen assembly 10 can be comprised of at least two components: a control element 20 and a test element 30. In one example, the control element 20 is formed from a material, such as metal or more specifically steel, that has well known properties, such as thermal coefficient of expansion. The test element 30 can be comprised of a potting material, plastic material, resin, or other material. The test element 30 may be the product of batch processing and its characteristics may not be readily determinable without testing. The test element 30 can be formed from a generally flowable material that is configured to be hardened, such as via curing. In one example, the material is a potting material, and in another example the material is an encapsulation material. Some examples for the materials used to form the test element 30 can include epoxies, urethanes, silicone polyester resins for potting, and/or thermal-plastics for injection molding.

It is desirable to subject the test element 30 to controlled testing, such as thermal fatigue testing, in order to ascertain the specific characteristics of the test element 30. Because the control element 20 and the test element 30 are formed from different materials, as the test specimen assembly is thermally strained (i.e. relatively low temperatures and relatively high temperatures are cyclically applied), the control element 20 and the test element 30 will expand and contract at variable rates.

In one example, a method for testing the thermal fatigue of the test specimen assembly 10, and more specifically a method for testing the thermal fatigue of the test element 30 is disclosed herein. The method can include providing the test specimen assembly 10 which includes the control element 20 at least partially embedded within the test element 30. The control element 20 can be comprised of a body 22 having a discontinuous profile with a slot 24. The method can include cyclically subjecting the test specimen assembly to a first temperature (T1) and a second temperature (T2) for a period of time until the test specimen assembly 10 experiences fatigue cracking. The first temperature (T1) and the second temperature (T2) have a temperature differential. For example, the temperature differential can be at least 100° C. In one example, the first temperature (T1) is 15° C.-30° C. In one specific example, the first temperature is 20° C.-25° C. In one example, the second temperature (T2) is 155° C.-170° C. In another example, the second temperature (T2) is 160° C.-165° C. In one specific example, the first temperature (T1) is 22° C. and the second temperature (T2) is 163° C.

As best shown in FIG. 1B, in one aspect, the control element 20 comprises a first axial end 26a and a second axial end 26b, and the slot 24 extends continuously between the first axial end 26a and the second axial end 26b. As also shown in FIG. 1B, at least one of the first axial end 26a or the second axial end 26b of the control element 20 is coplanar with an axial end 32a of the test element 30.

The body 22 of the control element 20 can have a circular profile that is continuously curved. One of ordinary skill in the art would understand that the profile and geometry of the control element 20 could vary. For example, the control element 20 could have a square profile, rectangular profile, oval shaped profile, etc.

The body 22 of the control element 20 can have a length (L) and a thickness (T), and the length (L) can be at least 15-40 times greater than the thickness (T). More specifically, the length (L) can be 15-20 times greater than the thickness (T). The body 22 of the control element 20 can have a thickness (T) and the slot 24 has an extent (E), and the extent (E) is 80%-120% of the thickness (T). The test element 30 can have a depth (D) and the body 22 of the control element 20 can have a length (L) that is 70%-90% of the depth (D).

One of ordinary skill in the art would understand that these dimensions can vary depending on the specific requirements of a particular assembly or application. In one configuration, the control element 20 is positioned relatively close to an outer diameter or surface of the test element 30. In one example, the control element 20 can be arranged within 1 mm-5 mm of the outer surface of the test element 30.

Figure 2:
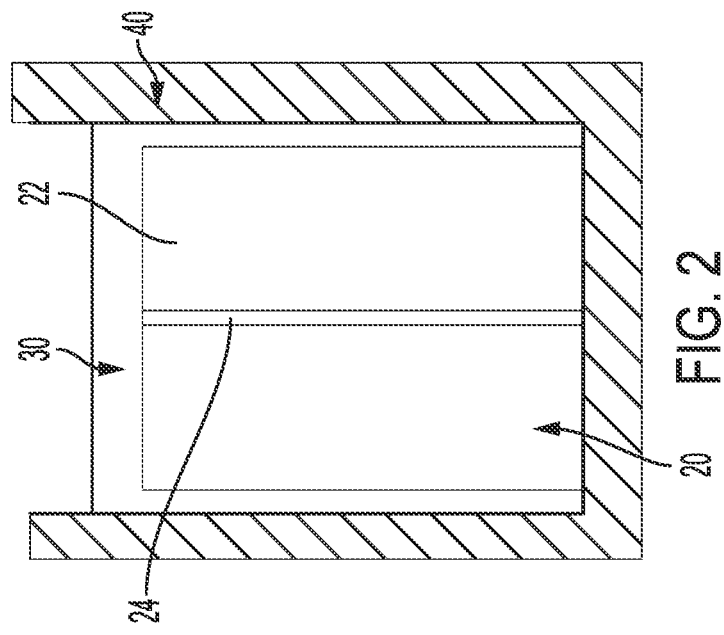
FIG. 2 is a side view of one exemplary formation process for providing the test specimen assembly.

As shown in FIG. 2, the test specimen assembly 10 can be formed via positioning the control element 20 within a formation receptacle 40 and the test element 30 (i.e. potting material) can be poured into the formation receptacle 40 to a predetermined volume such that the control element 20 is embedded within the test element 30. Based on this formation method, a lower edge of the control element 20 and the test element 30 will be co-planar. The test element 30 can be filled to a volume such that additional potting material is provided above an upper edge of the control element 20.

Figure 3:
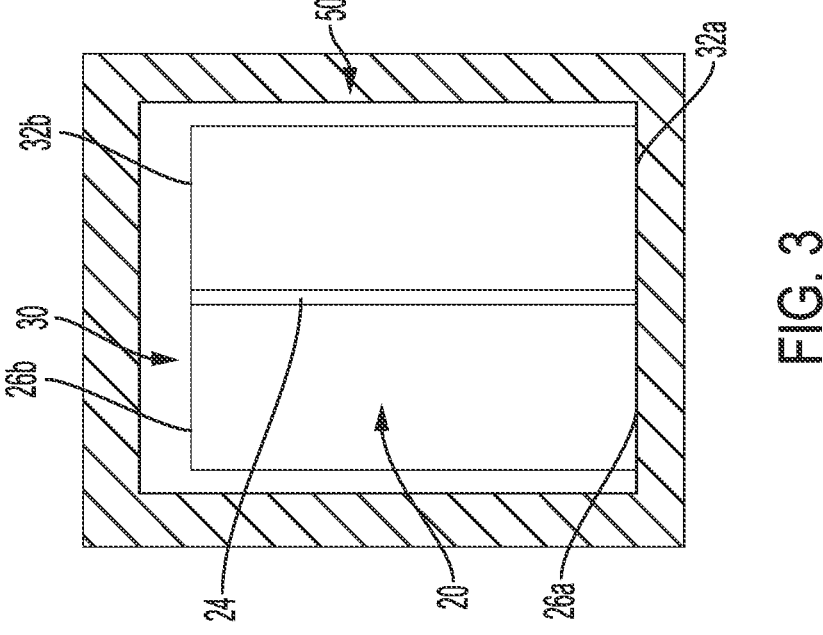
FIG. 3 is a side view of one exemplary formation process for providing the test specimen assembly.

As shown in FIG. 3, the test specimen assembly 10 can be formed via injection molding the test element 30 (i.e. potting material) into an injection molding chamber or mold 50 that holds or contains the control element 20. In one example, the control element 20 can have an initial profile, which may be larger than the finished product. For example, the body of the control element 20 can be slightly larger than the finished product, and can be injection molded to be formed with the test element 30, and then later machined to remove excess material from the control element 20 such that the axial end 26b of the body 20 is coplanar with an axial end of the test element 30.

In another example, a test specimen assembly 10 is provided that includes a test element 30 comprised of a potting material, and a control element 20 comprising a body 22 formed from metal and having a discontinuous profile with a slot 24. The control element 20 can be at least partially embedded within the control element 20. The test specimen assembly 10 can be configured to undergo thermal fatigue testing until the test specimen assembly experience fatigue cracking. Based on the cycle count number when crack occurs, the durability of the test element 30 can be analyzed and determined. Tests on multiple materials can provide relative comparison of thermal cycling durability of the tested materials based on a number of test elements 30.

In another example, a method of forming a test specimen assembly for thermal fatigue testing is also disclosed. The method includes providing a control element 20 comprising a body 22 formed from metal and having a discontinuous profile with a slot 24 extending between a first and second axial end 26a, 26b of the body 22. The method can also include embedding the control element 20 at least partially within a test element 30 to form the test specimen assembly 10.

According to one example, the test specimen assembly disclosed herein can have a 1.05%-1.10% surface tensile thermal strain during the thermal fatigue testing, and can have a 2.90%-3.0% internal tensile thermal strain. In one example, the thermal strain on the test specimen assembly is 1.5-2.5 times higher than other test specimen assemblies. Accordingly, the test specimen assembly can experience failure at a much higher rate than other test specimen assemblies. This is advantageous because it saves the testing personnel time and resources. According to one example, the present disclosure is advantageous in that the geometry of the control element 20 is favorable for FEA analysis due to its lack of intricacies.

According to one example, failure, i.e. fracture initiation, can occur at the axial end 26b (i.e. the buried end) of the control element 20. One of ordinary skill in the art would understand that failure could occur in other regions. The testing of the specimen is designed to induce cracking or failure. The cycle count at which the crack or failure occurs can be used to quantify the durability of the specimen. Various analysis tools, such as FEA, can be implemented with the test temperature data or information to reveal the strain. Based on this information, a strain-cycle curve can be generated and can be used together with an overall assembly FEA strain dataset to predict the crack cycle for a particular assembly that uses material formed from the test element 30.

According to one advantage, the present disclosure saves benchmark time for material screening.

According to one specific example, the test element 30 can be comprised of XW6640-1 material. In another example, the test element 30 can be comprised of potting materials XE2010VE6 and EP2000.

Figure 4:
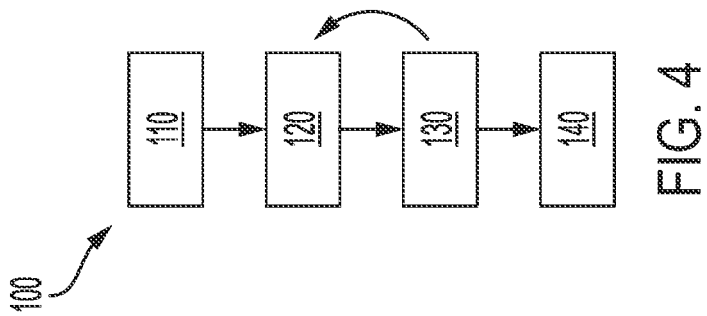
FIG. 4 is a flow diagram showing steps according to one exemplary process of testing thermal fatigue for a test specimen assembly.

FIG. 4 illustrates a method 100 flow diagram including multiple steps for testing thermal fatigue for a test specimen assembly. The method 100 can include providing a test specimen assembly 10 including a control element 20 at least partially embedded within a test element 30, wherein the control element 20 comprising a body 22 having a discontinuous profile with a slot 24 as step 110. Step 120 can include subjecting the test specimen assembly 10 to a first temperature (T1). Step 130 can include subjecting the test specimen assembly 10 to a second temperature (T2). Steps 120 and 130 can cyclically repeat for a period of time until the test specimen assembly 10 experiences fatigue cracking at step 140. One of ordinary skill in the art would understand that additional steps could be included.

Figure 5:
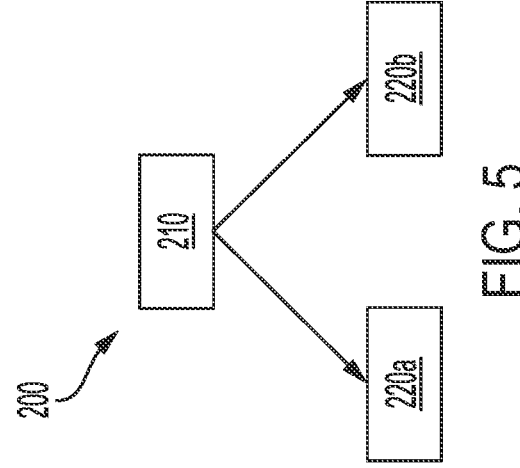
FIG. 5 is a flow diagram showing steps according to one exemplary process of forming a test specimen assembly for thermal fatigue testing.

FIG. 5 shows a method 200 including steps according to one exemplary process of forming a test specimen assembly for thermal fatigue testing. Step 210 can include (a) providing a control element 20 comprising a body 22 formed from metal and having a discontinuous profile with a slot 24 extending between a first and second axial end 26a, 26b of the body 22. The next step can include embedding the control element 20 at least partially within a test element 30 to form the test specimen assembly 10, which may include curing or hardening the control element 20. The test element 30 is comprised of a potting material. In one example, step 220a includes injection molding the potting material to embed the control element 20 within the test element 30. In another example, step 220b includes pouring the potting material to embed the control element 20 within the test element 30. One of ordinary skill in the art would understand that additional steps could be included, such as additional machining or processing steps for the control element 20.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Test specimen assembly 10
Control element 20
Body 22
Slot 24
Axial ends 26a, 26b of control element
Test element 30
Axial end 32a of test element
Formation receptacle 40
Injection molding chamber 50

What is claimed is:

1. A method for testing thermal fatigue, the method comprising:
   (a) providing a test specimen assembly including a control element at least partially embedded within a test element, the control element comprising a body having a discontinuous profile with a single slot, the profile of the body is discontinuous in a circumferential direction at the single slot and continuous in the circumferential direction elsewhere; and
   (b) cyclically subjecting the test specimen assembly to a first temperature (T1) and a second temperature (T2) for a period of time until the test specimen assembly experiences fatigue cracking, wherein the first temperature (T1) and the second temperature (T2) have a temperature differential;
   wherein the control element includes inner and outer circumferential surfaces extending between the slot, and the test element surrounds the inner and outer circumferential surfaces and extends through the slot.

2. The method according to claim 1, wherein the control element further comprises a first axial end and a second axial end, and the slot extends continuously between the first axial end and the second axial end, and wherein the discontinuous profile with a slot defines a c-shape cross-section at each of the first axial end and the second axial end.

3. The method according to claim 2, wherein at least one of the first axial end or the second axial end of the control element is coplanar with an axial end of the test element.

4. The method according to claim 1, wherein the body of the control element has a continuously curved.

5. The method according to claim 1, wherein the body of the control element has a length (L) and a thickness (T), and the length (L) is at least 15 times greater than the thickness (T).

6. The method according to claim 1, wherein the body of the control element has a thickness (T) and the slot has an extent (E), and the extent (E) is 80%-120% of the thickness (T).

7. The method according to claim 1, wherein the temperature differential is at least 100° C.

8. The method according to claim 1, wherein the control element is comprised of steel, and the testing element is comprised of potting material.

9. The method according to claim 1, wherein the test element has a depth (D) and the body of the control element has a length (L) that is 70%-90% of the depth (D).

10. The method according to claim 1, wherein the test specimen assembly is formed via positioning control element within a formation receptacle and the test element is comprised of a potting material that is poured into the formation receptacle to a predetermined volume such that the control element is embedded within the test element.

11. The method according to claim 1, wherein the test specimen assembly is formed via injection molding the test element into an injection molding chamber holding the control element, wherein the body of the control element has an initial shape during injection molding, and the control element is machined after injection molding to remove excess material from the body such that an axial end of the control element is coplanar with an axial end of the test element.

12. A test specimen assembly comprising:

a test element comprised of a potting material; and a control element comprising a body formed from a metal and having a discontinuous profile with a single slot, the profile of the body is discontinuous in a circumferential direction at the single slot and continuous in the circumferential direction elsewhere, the control element being at least partially embedded within the test element, wherein the test specimen assembly is configured to undergo thermal fatigue testing until the test specimen assembly experience fatigue cracking;

wherein the control element includes inner and outer circumferential surfaces extending between the slot, and the test element surrounds the inner and outer circumferential surfaces and extends through the slot.

13. The test specimen assembly according to claim 12, wherein the discontinuous profile with a slot defines a c-shape cross-section, wherein the control element comprises a first axial end and a second axial end, the slot extends continuously between the first axial end and the second axial end, and at least one of the first axial end or the second axial end is coplanar with an axial end of the test element, and wherein the body has the c-shape cross-section at each of the first axial end and the second axial end.

14. The test specimen assembly according to claim 12, wherein the body of the control element has a continuously curved, and the body has a length (L) and a thickness (T), and the length (L) is at least 15 times greater than the thickness (T).

15. The test specimen assembly according to claim 12, wherein the body of the control element has a thickness (T) and the slot has an extent (E), and the extent (E) is 80%-120% of the thickness (T).

16. The test specimen assembly according to claim 12, wherein the test specimen assembly is formed via either injection molding or pouring the potting material of the test element to encapsulate the control element.

17. A method of forming a test specimen assembly for thermal fatigue testing, the method comprising:

(a) providing a control element comprising a body formed from metal and having a discontinuous profile with a single slot extending between a first and second axial end of the body, the profile of the body is discontinuous in a circumferential direction at the single slot and continuous in the circumferential direction elsewhere; and (b) embedding the control element at least partially within a test element to form the test specimen assembly;

wherein the control element includes inner and outer circumferential surfaces extending between the slot, and the test element surrounds the inner and outer circumferential surfaces and extends through the slot.

18. The method according to claim 17, wherein at least one of the first axial end or the second axial end of the control element is coplanar with an axial end of the test element, and the test element has a depth (D) and the body has a length (L) that is 70%-90% of the depth (D).

19. The method according to claim 17, wherein the test element is comprised of a potting material, and step (b) includes either injection molding the potting material or pouring the potting material to embed the control element within the test element.

20. The method according to claim 17, wherein the body of the control element has a thickness (T) and the slot has an extent (E), and the extent (E) is 80%-120% of the thickness (T).

21. The method according to claim 17, wherein the discontinuous profile with a slot defines a c-shape cross-section at each of the first axial end and the second axial end.

* * * * *